US009457659B2

United States Patent
Kempf et al.

(10) Patent No.: US 9,457,659 B2
(45) Date of Patent: Oct. 4, 2016

(54) TRANSMISSION WITH INTEGRATED POWER TAKE-OFF

(71) Applicant: GM Global Technology Operations LLC, Detroit, MI (US)

(72) Inventors: Gregory W. Kempf, Rochester Hills, MI (US); Chi Teck Lee, Novi, IN (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/573,792

(22) Filed: Dec. 17, 2014

(65) Prior Publication Data

US 2016/0176288 A1 Jun. 23, 2016

(51) Int. Cl.
| | |
|---|---|
| *B60K 25/06* | (2006.01) |
| *B60K 17/28* | (2006.01) |
| *F16H 7/06* | (2006.01) |
| *F16D 25/0638* | (2006.01) |
| *B60K 25/02* | (2006.01) |

(52) U.S. Cl.
CPC .............. *B60K 25/06* (2013.01); *B60K 17/28* (2013.01); *B60K 25/02* (2013.01); *F16D 25/0638* (2013.01); *F16H 7/06* (2013.01); *B60K 2025/022* (2013.01)

(58) Field of Classification Search
CPC ...... B60K 17/28; B60K 25/06; B60K 25/02; B60K 2025/022; F16H 7/06; F16D 25/0638
See application file for complete search history.

(56) References Cited

U.S. PATENT DOCUMENTS

| | | | | |
|---|---|---|---|---|
| 2,314,549 A | * | 3/1943 | Milbrath | F16H 3/00 192/93 R |
| 3,089,574 A | * | 5/1963 | Howard | F16D 13/54 192/48.1 |
| 3,464,277 A | * | 9/1969 | Longshore | F16H 3/001 74/15.4 |
| 5,056,302 A | * | 10/1991 | Rosenbalm | A01D 43/105 464/48 |
| 5,063,816 A | * | 11/1991 | Soga | F16H 61/66259 477/39 |
| 5,766,110 A | * | 6/1998 | Kanno | F16D 48/066 477/175 |
| 6,269,895 B1 | * | 8/2001 | Tanuguchi | B60K 6/365 180/65.1 |
| 6,601,474 B2 | * | 8/2003 | Ishimaru | B60K 17/105 180/247 |
| 6,852,055 B2 | * | 2/2005 | Kmicikiewicz | B60K 6/36 475/151 |
| 6,854,541 B2 | * | 2/2005 | Matufuji | B60K 17/28 180/53.1 |
| 8,056,670 B2 | * | 11/2011 | Ohashi | A01D 34/6806 180/307 |
| 8,262,539 B2 | * | 9/2012 | Ohashi | F16D 21/06 477/57 |
| 8,297,386 B2 | * | 10/2012 | Osuga | B60K 17/105 180/53.6 |
| 2007/0066434 A1 | * | 3/2007 | Iida | A01D 69/08 475/89 |
| 2014/0142820 A1 | * | 5/2014 | Pociask | B60W 10/02 701/53 |
| 2014/0303863 A1 | * | 10/2014 | Kurata | F16D 48/06 701/67 |
| 2014/0335984 A1 | * | 11/2014 | Quehenberger | F16H 7/06 474/86 |
| 2014/0360290 A1 | | 12/2014 | Kempf et al. | |
| 2015/0141189 A1 | * | 5/2015 | Nakano | F16D 23/12 475/116 |
| 2015/0367728 A1 | * | 12/2015 | Neumann | B60K 25/02 74/15.6 |

\* cited by examiner

*Primary Examiner* — Ruth Ilan
*Assistant Examiner* — Timothy Wilhelm

(57) ABSTRACT

A transmission includes a housing, an input shaft, a transfer shaft, a first and second transfer members, a continuous transfer member, a drive shaft, and a torque transmitting mechanism. The input shaft and transfer shaft are each rotatably supported by the housing and are parallel to each other. The first transfer member is connected for common rotation with the input shaft. The second transfer member is connected for common rotation with the transfer shaft. The continuous transfer member is engaged with each of the first and second transfer members. The drive shaft is disposed coaxially and partially covered by the transfer shaft. The torque transmitting mechanism selectively connects the transfer shaft with the drive shaft.

20 Claims, 1 Drawing Sheet

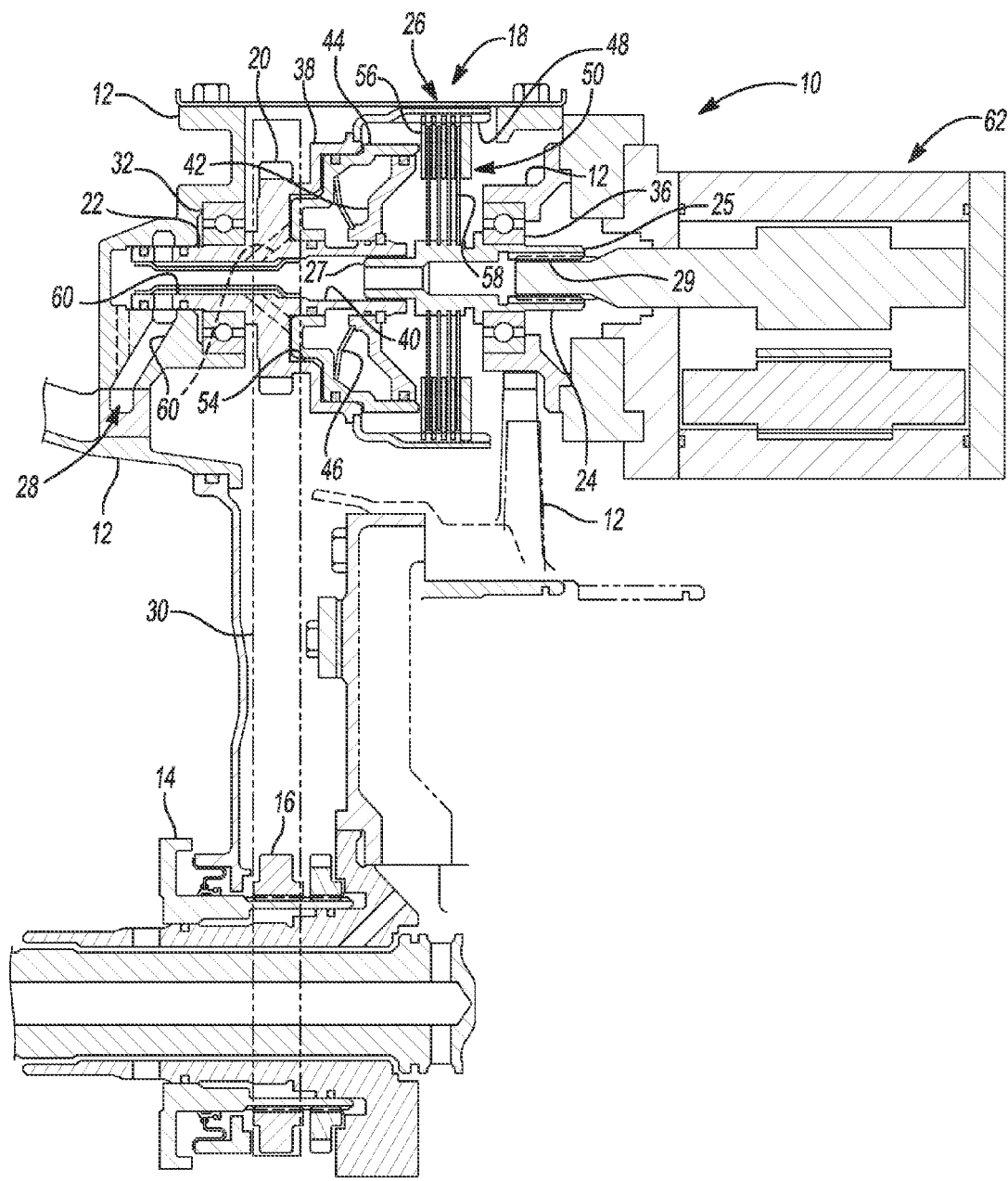

TRANSMISSION WITH INTEGRATED POWER TAKE-OFF

FIELD

The present disclosure relates to vehicular powertrains and more particularly to transmissions having multiple power output means.

BACKGROUND

The statements in this section merely provide background information related to the present disclosure and may or may not constitute prior art.

Most types of transmissions include an input shaft, an output shaft, a plurality of gear arrangements, interconnecting members, shafts, and torque transmitting mechanisms among other mechanical members. The various torque transmitting mechanisms are employed to selectively transmit torque from one rotating member to another or from a rotating member to a stationary member to achieve a specific speed ratio between the input and output shafts. The output shaft drives a final drive assembly which may have a further speed ratio change between the transmission output shaft and the axle. The output shaft may also drive a separate drive implement such as a power take-off assembly or other type of equipment requiring torque for operation.

While these transmissions are effective they are limited in that they are only capable of a single output shaft. Accordingly, there is a constant need for improved transmission designs that provide flexibility in connectivity and minimized volume packaging.

SUMMARY

A transmission is provided having a transmission housing, an input shaft, a transfer shaft, a first and second output shafts, a first and second transfer member, a continuous transfer member, and a torque transmitting mechanism. Each of the input and transfer shafts are rotatably supported by the housing, and wherein an axis of the transfer shaft is parallel to an axis of the input shaft. The first transfer member is connected for common rotation with the input shaft. The second transfer member is connected for common rotation with the transfer shaft. The first output shaft is disposed coaxially and partially covered by the transfer shaft. The second output shaft is disposed coaxially with the input shaft. The continuous transfer member engaged with each of the first and second transfer members. The torque transmitting mechanism selectively connects the transfer shaft with the first output shaft. The first output shaft is configured to receive an implement assembly and the second output shaft is drivingly connected to a differential for torque transfer to a drive wheel.

In another example of the present invention, the first transfer member is a drive sprocket, the second transfer member is a driven sprocket, and the continuous transfer member is a chain.

In yet another example of the present invention, the first transfer member is formed integrally with the input shaft to form a drive transfer member.

In yet another example of the present invention, the second transfer member is formed integrally with the transfer shaft to form a driven transfer member.

In yet another example of the present invention, the transfer shaft is rotatably supported by the transmission housing through a roller bearing, the drive shaft is rotatably supported at a first end by the transmission housing through a roller bearing and is rotatably supported and partially covered at a second end by the transfer shaft.

In yet another example of the present invention, the torque transmitting mechanism is a hydraulic piston clutch.

In yet another example of the present invention, the hydraulic piston clutch includes a piston housing connected for common rotation with the second transfer member, a piston, a return spring, a ring member, and a plurality of clutch plates.

In yet another example of the present invention, the piston housing is integrated with the second transfer member and transfer shaft and the ring member is connected for common rotation with the piston housing.

In yet another example of the present invention, the transmission of claim 8 further includes a hydraulic fluid circuit for selectively communicating pressurized hydraulic fluid to an apply fluid chamber of the clutch.

In yet another example of the present invention, the first transfer member is a drive gear, the second transfer member is a driven gear, and the continuous transfer member is an idler gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

FIG. 1 is a cross section of a portion of a transmission according to the principles of the present invention.

DETAILED DESCRIPTION

The following description is merely exemplary in nature and is not intended to limit the present disclosure, application, or uses.

With reference to FIG. 1, a portion of a transmission for a motor vehicle is generally indicated by reference number 10. The transmission 10 generally is a part of a powertrain of a vehicle that includes an engine (not shown) interconnected with the transmission 10. The engine may be a conventional gasoline, diesel fuel, or flex-fuel internal combustion engine, a hybrid engine, or an electric motor, or any other type of prime mover, without departing from the scope of the present disclosure. The engine supplies a driving torque to the transmission 10 through, for example, a flexplate or other connecting device or a starting device such as a hydrodynamic device or launch clutch (not shown).

The transmission 10 is may be a variable diameter pulley or sheave drive continuously variable transmission (CVT), a multi-speed planetary gear set automatic transmission, or a manual transmission without departing from the scope of the invention. The transmission 10 includes a typically cast, metal housing 12 which encloses and protects the various components of the transmission 10. The housing 12 includes a variety of apertures, passageways, shoulders and flanges which position and support these components. Generally speaking, the transmission 10 includes a transmission input shaft 14 and a first transmission output shaft (not shown). Connected between the transmission input shaft 14 and the first transmission output shaft is optionally a speed change device, a pulley assembly or continuously variable unit, and a torque transfer assembly that cooperate to provide forward and reverse speed or gear ratios between the transmission input shaft 14 and the transmission output shaft. The transmission input shaft 14 is functionally interconnected with the engine (not shown) through the starting device (not shown) and receives input torque or power from the engine. The transmission output shaft is preferably connected with a final drive unit (not shown). The first transmission output shaft provides drive torque to the final drive unit. The final drive unit may include a differential, axle shafts, and road wheels (not shown).

The transmission 10 further includes an off-axis drive and clutch assembly 18. The drive and clutch assembly 18 includes a drive sprocket 16, a driven sprocket 20, a transfer shaft 22, a second output shaft 24, a torque transmitting mechanism or disconnect clutch 26, a clutch apply hydraulic fluid circuit 28, and a continuous transfer member 30. The driven shaft 22 is rotatably supported by the housing 12 through a first bearing 32. The driven sprocket 20 is connected for common rotation with the driven shaft 22, or in the alternative, is integrated with the driven shaft 22 as a singular rotating member. The driven sprocket 20 is axially aligned with a drive sprocket 34 of the transmission which is connected for common rotation with the input shaft 14. The continuous transfer member 30 engages with each of the driven sprocket 20 and drive sprocket 34 thus transferring torque from the input shaft 14 to the driven shaft 22. As shown in FIG. 1, the continuous transfer member 30 is a chain or belt. However, without departing from the scope of the invention, the continuous transfer member 30 may also be replaced by an idler gear and the drive and driven sprockets 16, 20 may be replaced by a drive and driven gear supported by the housing 12 and meshing with the idler gear.

The second output shaft 24 is coaxial with the driven shaft 22, is rotatably supported on a first end 25 by the housing 12 through a second bearing 36, is partially covered and rotatably supported on a second end 27 by the driven shaft 22, and has an splined inner surface 29 at the first end 25. The disconnect clutch 26 is disposed coaxially with the driven shaft 22 and the second output shaft 24 and selectively connects the driven shaft 22 and driven sprocket 20 to the second output shaft 24. The disconnect clutch 26 includes a first or outer piston housing member 38, a second or inner piston housing member 40, a balance piston 42, a hydraulic piston 44, a return spring 46, a ring member 48, and a plurality of interleaved clutch plates 50. More specifically, the outer piston housing member 38 is disposed on or integrated into the driven sprocket 20. Similarly, the inner piston housing member 40 is disposed on or integrated into the driven shaft 22. The radial piston housing member 42 is disposed between the outer piston housing member 38 and the inner piston housing member 40 and forms a piston chamber 52. The piston 44 is disposed between the outer piston housing member 38 and the balance piston 42 and forms a hydraulic fluid apply chamber 54 with the outer piston housing member 38. The return spring 46 is disposed between the balance piston 42 and the piston 44 thus providing a return force urging the piston 44 towards the outer piston housing member 38.

The ring member 48 is splined to or otherwise connected for common rotation with the outer piston housing member 38. The plurality of interleaved clutch plates 50 includes a first set of clutch plates 56 having spline teeth on the outer periphery of the clutch plates and a second set of clutch plates 58 having spline teeth on the inner periphery of the clutch plates. The first set of clutch plates 56 is splined to the ring member 48. The second set of clutch plates 58 is splined for common rotation with the second output shaft 24. Upon selective pressurization of the hydraulic fluid apply chamber 54, the piston 44 translates axially to contact and compress the plurality of clutch plates 50 to lock the first set of clutch plates 56 into common rotation with the second set of clutch plates 58. The result is common rotation and torque transfer from the driven sprocket 20 to the second output shaft 24.

The clutch apply hydraulic fluid circuit 28 includes a number of hydraulic fluid passages 60 disposed within the housing 12, the driven shaft 22, and the driven sprocket 20. The clutch apply hydraulic fluid circuit 28 is in communication with a hydraulic valve (not shown) and a hydraulic pressure source (not shown) to selectively provide pressurized hydraulic fluid to the disconnect clutch 26.

The transmission 10 further includes a torque receiving implement 62. FIG. 1 illustrates a hydraulic fluid pump 62 as the torque receiving implement 62. However, other types of torque receiving implements 62 may be employed without departing from the scope of the invention. For example, a housing including a prop shaft for driving a mechanical device may be used.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission, the transmission comprising:
   a transmission housing;
   an input shaft, a transfer shaft, and a first and second output shafts, and wherein each of the shafts are rotatably supported by the housing, the input shaft and the second output shaft are coaxial, the second output shaft is a transmission output shaft, the input shaft is a sleeve shaft through which the second output shaft passes through, and an axis of the transfer shaft is parallel to an axis of the input shaft;
   a first and second transfer member, and wherein the first transfer member is connected for common rotation with the input shaft, the second transfer member is connected for common rotation with the transfer shaft, the first output shaft is disposed coaxially and partially covered by the transfer shaft, and the second output shaft is disposed coaxially with the input shaft;
   a continuous transfer member engaged with each of the first and second transfer members;
   a torque transmitting mechanism for selectively connecting the transfer shaft with the first output shaft; and
   wherein the first output shaft is configured to receive an implement assembly.

2. The transmission of claim 1 wherein the first transfer member is a drive sprocket, the second transfer member is a driven sprocket, and the continuous transfer member is a chain.

3. The transmission of claim 1 wherein first transfer member is formed integrally with the input shaft to form a drive transfer member.

4. The transmission of claim 1 wherein the second transfer member is formed integrally with the transfer shaft to form a driven transfer member.

5. The transmission of claim 1 wherein the transfer shaft is rotatably supported by the transmission housing through a roller bearing, the first output shaft is rotatably supported at a first end by the transmission housing through a roller bearing and is rotatably supported and partially covered at a second end by the transfer shaft.

6. The transmission of claim 1 wherein the torque transmitting mechanism is a hydraulic piston clutch.

7. The transmission of claim 6 wherein the hydraulic piston clutch includes a piston housing connected for common rotation with the second transfer member, a piston, a return spring, a ring member, and a plurality of clutch plates.

8. The transmission of claim 7 wherein the piston housing is integrated with the second transfer member and transfer shaft and the ring member is connected for common rotation with the piston housing.

9. The transmission of claim 8 further including a hydraulic fluid circuit for selectively communicating pressurized hydraulic fluid to an apply fluid chamber of the clutch.

10. The transmission of claim 1 wherein the first transfer member is a drive gear, the second transfer member is a driven gear, and the continuous transfer member is an idler gear.

11. A transmission, the transmission comprising:
a transmission housing;
an input shaft, a transfer shaft, and a first and second output shafts, and wherein each of the shafts are rotatably supported by the housing, the input shaft and the second output shaft are coaxial, the second output shaft is a transmission output shaft, the input shaft is a sleeve shaft through which the second output shaft passes through, and an axis of the transfer shaft is parallel to an axis of the input shaft;
a drive sprocket and a driven sprocket, and wherein the drive sprocket is connected for common rotation with the input shaft, the driven sprocket is connected for common rotation with the transfer shaft, the first output shaft is disposed coaxially and partially covered by the transfer shaft, and the second output shaft is disposed coaxially with the input shaft;
a continuous chain engaged with each of the drive sprocket and the driven sprocket;
a hydraulic piston clutch for selectively connecting the transfer shaft with the first output shaft; and
wherein the first output shaft is configured to receive an implement assembly and the second output shaft is drivingly connected to a differential for torque transfer to a drive wheel.

12. The transmission of claim 11 wherein the drive sprocket is formed integrally with the input shaft to form a drive transfer member and the driven sprocket is formed integrally with the transfer shaft to form a driven transfer member.

13. The transmission of claim 11 wherein the transfer shaft is rotatably supported by the transmission housing through a roller bearing, the drive shaft is rotatably supported at a first end by the transmission housing through a roller bearing and is rotatably supported and partially covered at a second end by the transfer shaft.

14. The transmission of claim 11 wherein the hydraulic piston clutch includes a piston housing connected for common rotation with the second transfer member, a piston, a return spring, a ring member, and a plurality of clutch plates.

15. The transmission of claim 14 wherein the piston housing is integrated with the driven sprocket and transfer shaft and the ring member is connected for common rotation with the piston housing.

16. The transmission of claim 15 further including a hydraulic fluid circuit for selectively communicating pressurized hydraulic fluid to an apply fluid chamber of the clutch.

17. A transmission, the transmission comprising:
a transmission housing;
an input shaft, a transfer shaft, and a first and second output shafts, and wherein each of the shafts are rotatably supported by the housing, the input shaft and the second output shaft are coaxial, the second output shaft is a transmission output shaft, the input shaft is a sleeve shaft through which the second output shaft passes through, and an axis of the transfer shaft is parallel to an axis of the input shaft;
a drive sprocket and a driven sprocket, and wherein the drive sprocket is connected for common rotation with the input shaft, the driven sprocket is connected for common rotation with the transfer shaft, the first output shaft is disposed coaxially and partially covered by the transfer shaft, and the second output shaft is disposed coaxially with the input shaft;
a continuous chain engaged with each of the drive sprocket and the driven sprocket;
a hydraulic piston clutch for selectively connecting the transfer shaft with the first output shaft, and wherein the hydraulic piston clutch includes a piston housing, a piston, a return spring, a ring member, and a plurality of clutch plates;
a hydraulic fluid circuit for selectively communicating pressurized hydraulic fluid to an apply fluid chamber of the clutch; and
wherein the first output shaft is configured to receive an implement assembly and the second output shaft is drivingly connected to a differential for torque transfer to a drive wheel.

18. The transmission of claim 17 wherein the drive sprocket is formed integrally with the input shaft to form a drive transfer member and the driven sprocket is formed integrally with the transfer shaft to form a driven transfer member.

19. The transmission of claim 18 wherein the transfer shaft is rotatably supported by the transmission housing through a roller bearing, the drive shaft is rotatably supported at a first end by the transmission housing through a roller bearing and is rotatably supported and partially covered at a second end by the transfer shaft.

20. The transmission of claim 19 wherein the piston housing is integrated with the driven transfer member and the ring member is connected for common rotation with the piston housing.

* * * * *